(12) United States Patent
Yamazaki et al.

(10) Patent No.: US 7,608,339 B2
(45) Date of Patent: Oct. 27, 2009

(54) MULTILAYER FILM

(75) Inventors: Masahiro Yamazaki, Ibaraki (JP); Hideaki Tanaka, Ibaraki (JP); Yusaku Inaba, Ibaraki (JP)

(73) Assignee: Kureha Corporation, Tokyo (JP)

( * ) Notice: Subject to any disclaimer, the term of this patent is extended or adjusted under 35 U.S.C. 154(b) by 99 days.

(21) Appl. No.: 10/576,677

(22) PCT Filed: Oct. 20, 2004

(86) PCT No.: PCT/JP2004/015868

§ 371 (c)(1), (2), (4) Date: Apr. 21, 2006

(87) PCT Pub. No.: WO2005/037535

PCT Pub. Date: Apr. 28, 2005

(65) Prior Publication Data

US 2007/0134476 A1 Jun. 14, 2007
US 2008/0274341 A9 Nov. 6, 2008

(30) Foreign Application Priority Data

Oct. 22, 2003 (JP) .............................. 2003-362323

(51) Int. Cl.
 *B32B 27/00* (2006.01)
(52) U.S. Cl. ..................................... 428/500
(58) Field of Classification Search ........................ None
See application file for complete search history.

(56) References Cited

U.S. PATENT DOCUMENTS

| 5,112,673 A | 5/1992 | Sawada et al. |
| 5,498,662 A | 3/1996 | Tanaka et al. |
| 5,552,479 A | 9/1996 | Tanaka et al. |
| 5,560,988 A | 10/1996 | Oba et al. |
| 5,574,096 A | 11/1996 | Tanaka et al. |
| 6,022,913 A | 2/2000 | Tanaka et al. |
| 6,605,344 B1 * | 8/2003 | Ohba et al. .................. 428/332 |

FOREIGN PATENT DOCUMENTS

| EP | 0 488 779 A2 | 11/1991 |
| EP | 0 488 779 A3 | 11/1991 |
| EP | 0 852 206 A1 | 12/1997 |
| EP | 1 086 981 A1 | 4/1999 |
| JP | 01-304485 | 11/1989 |
| JP | 05-031404 | 1/1993 |
| JP | 05-262958 | 9/1993 |
| JP | 06-023735 | 1/1994 |
| JP | 06-194940 | 7/1994 |
| JP | 09-256216 | 9/1997 |
| JP | 11-104523 | 4/1999 |
| JP | 2002-098564 | 4/2002 |

OTHER PUBLICATIONS

European Patent Office Supplementary European Search Report for Application No./Patent No. 04792984.9-2124/1676700 PCT/JP2004015868, dated Sep. 23, 2008.

* cited by examiner

*Primary Examiner*—Sheeba Ahmed
(74) *Attorney, Agent, or Firm*—Reed Smith LLP; Nanda P. B. A. Kumar (57) ABSTRACT

A multi-layer film having a layer structure that a polyvalent metal compound-containing layer adjoins one side or both sides of a polymer layer containing a carboxyl group-containing polymer and a polyvalent metal salt of the carboxyl group-containing polymer, wherein the polymer layer has a concentration gradient structure that the concentration of the polyvalent metal salt of the carboxyl group-containing polymer in the polymer layer is continuously reduced in the thickness-wise direction from a surface adjoining the polyvalent metal compound-containing layer, and a peak ratio $A_{1560}/A_{1700}$ as determined on the basis of an infrared absorption spectrum of the polymer layer is at least 0.25.

16 Claims, 2 Drawing Sheets

MULTILAYER FILM

TECHNICAL FIELD

The present invention relates to a multi-layer film comprising a polymer layer containing a carboxyl group-containing polymer typified by poly(meth)acrylic acid and a polyvalent metal salt thereof. The multi-layer film according to the present invention is excellent in gas barrier property, moisture resistance, water resistance, hot water resistance and water vapor resistance and also excellent in gas barrier property under high-humidity conditions, to say nothing of low-humidity conditions.

Further, the multi-layer film according to the present invention can retain its excellent gas barrier property even when it is subjected to folding processing upon forming, or a formed product is flexed repeatedly after the forming because the gas barrier property of the polymer layer is recovered. The multi-layer film according to the present invention can be suitably used in a field of packaging materials making good use of these various properties.

In the present invention, the film means not only a film having a thickness smaller than 0.25 mm, but also a sheet having a thickness not smaller than 0.25 mm. In the present invention, poly(meth)acrylic acid also means polyacrylic acid or polymethacrylic acid, or a mixture thereof.

BACKGROUND ART

A polyvinyl alcohol film is excellent in gas barrier property, but insufficient in moisture resistance and water resistance and has great dependence of gas barrier property on humidity. Therefore, this film tends to markedly lower its gas barrier property depending on humidity. An ethylene-vinyl alcohol copolymer film is relatively good in gas barrier property and water resistance, but has great dependence of gas barrier property on humidity. A poly(meth)acrylic acid film exhibits excellent gas barrier property under dry conditions such as a relative humidity of 0%, but is poor in moisture resistance, water resistance, hot water resistance and water vapor resistance. In particular, its gas barrier property is markedly deteriorated under high-humidity conditions.

There have heretofore been proposed processes for providing a film excellent in gas barrier property, water resistance and hot water resistance and little in dependence of gas barrier property on humidity by subjecting a coating film formed from a mixture of poly(meth)acrylic acid or a partially neutralized product thereof and polyvinyl alcohol or a saccharide to a heat treatment (for example, Japanese Patent Nos. 2736600, 2811540, 3203287 and 3340780).

According to these processes, however, it is necessary to subject the coating film formed of the mixture to a heat treatment over a relatively long period of time at a high temperature of at least 100° C. for obtaining a gas barrier film. In addition, in the film described above, an ester bond is formed between both polymers by the heat treatment. As a result, the film undergoes high crosslinking, so that it is difficult to scrap or regenerate the film after use.

There has been proposed a process for producing a gas barrier film improved in hot water resistance and water vapor resistance by subjecting a coating film formed of a mixture of poly(meth)acrylic acid and polyvinyl alcohol or a saccharide to a heat treatment to form a film and then subjecting the film to a dipping treatment in a medium containing an alkali metal or alkaline earth metal to introduce an ionic bond between poly(meth)acrylic acid and the metal (for example, Japanese Patent Application Laid-Open No. 10-237180).

There has been proposed a process for producing a film excellent in gas barrier property, hot water resistance and water vapor resistance by forming a metal compound-containing layer on the surface of a coating film formed from a mixture of poly(meth)acrylic acid or a partially neutralized product thereof and polyvinyl alcohol or a saccharide to form an ionic bond by migration of the metal compound into the coating film (for example, Japanese Patent Application Laid-Open No. 2000-931).

Into the respective films disclosed in Japanese Patent Application Laid-Open Nos. 10-237180 and 2000-931, an ionically crosslinked (also referred to as metallically crosslinked) structure by an ionic bond is introduced in addition to a crosslinked structure by an ester bond formed by the heat treatment.

However, the processes for introducing the ionic bond making use of the metal compound, which is disclosed in Japanese Patent Application Laid-Open Nos. 10-237180 and 2000-931, also require to heat-treating the coating film having the above-described composition under high-temperature conditions. In addition, such a film is difficult to scrap or regenerate because the film has the crosslinked structure by the ester bond.

On the other hand, there has been proposed a moisture-proof film having a laminate structure that a polyvinyl alcohol film, on at least one surface of which a thin silicon oxide film is formed, and a transparent film containing at least one transparent plastic film having a thin silicon oxide film on at least one surface thereof are joined to each other (for example, Japanese Patent Application Laid-Open No. 2-258251). The thin silicon oxide film is formed by vapor-depositing silicon oxide on the respective films. Such a deposition film of silicon oxide tends to produce minute cracks by flexing. Oxygen gas and moisture permeate through the minute cracks. Therefore, the gas barrier property and moisture proofness of this moistureproof film are deteriorated when the film is subjected to flex fatigue.

Not only the deposition film of silicon oxide, but also a plastic film with a metal foil such as an aluminum foil laminated thereon produces cracks by folding processing and flex fatigue. Therefore, such a film does not avoid the deterioration of gas barrier property. Thus, a multi-layer film having the deposition film of silicon oxide or aluminum foil is limited in forming and processing or use.

DISCLOSURE OF THE INVENTION

It is an object of present invention to provide a multi-layer film comprising a film obtained by ionically crosslinking a carboxyl group-containing polymer with a polyvalent metal and having excellent gas barrier property, moisture resistance, water resistance, hot water resistance and water vapor resistance and also having excellent gas barrier property under high-humidity conditions, to say nothing of low-humidity conditions.

It is particularly an object of the present invention to provide a multi-layer film whose inherent excellent gas barrier property can be recovered even when the gas barrier property is temporally deteriorated under folding processing or flex fatigue.

The present inventors have carried out an extensive investigation with a view toward achieving the above objects. As a result, it has been found that a film excellent in gas barrier property, moisture resistance, water resistance, hot water resistance and water vapor resistance and also excellent in gas barrier property under high-humidity conditions, to say nothing of low-humidity conditions, can be obtained by ionically crosslinking a carboxyl group-containing polymer such as poly(meth)acrylic acid with a polyvalent metal.

Since this film is neither dissolved in nor deformed by water, hot water, water vapor and the like under ordinary service conditions, but dissolved in strongly acidic or alkaline water, the film can be easily scrapped or regenerated. However, it has also been found that when this film or a multi-layer film comprising this film is subjected to folding processing, or a formed product after its forming and processing is subjected to flex fatigue, its oxygen gas barrier property is deteriorated.

Thus, the present inventors have carried out a further investigation. As a result, the inventors have conceived of a method that in the film obtained by ionically crosslinking the carboxyl group-containing polymer with the polyvalent metal, a gradient structure is provided in a thickness-wise direction in the concentration of a polyvalent metal salt formed by the reaction of the carboxyl group-containing polymer with a polyvalent metal compound. In other words, in order to ionically crosslink the carboxyl group-containing polymer with the polyvalent metal, it is necessary to react the carboxyl group-containing polymer with a polyvalent metal compound to form a polyvalent metal salt. This polyvalent metal salt is a salt obtained by tonically bonding the carboxyl group of the carboxyl group-containing polymer to the polyvalent metal.

Upon the reaction of the carboxyl group-containing polymer with the polyvalent metal compound, the concentration distribution of the polyvalent metal salt of the carboxyl group-containing polymer in the resultant film is not made even in the thickness-wise direction, but a concentration gradient is provided in the thickness-wise direction to provide a region containing the polyvalent metal salt at a high concentration and a region containing the polyvalent metal salt at a low concentration. Such a concentration gradient structure can be formed by a process comprising causing a polyvalent metal compound-containing layer to adjoin one side or both sides of a carboxyl group-containing polymer layer to cause the polyvalent metal compound to migrate from the polyvalent metal compound-containing layer into the carboxyl group-containing polymer layer.

By the above-described process, is obtained a multi-layer film having a layer structure that the polyvalent metal compound-containing layer adjoins one side or both sides of the polymer layer containing the carboxyl group-containing polymer and the polyvalent metal salt of the carboxyl group-containing polymer. In this multi-layer film, the polymer layer has a concentration gradient structure that the concentration of the polyvalent metal salt of the carboxyl group-containing polymer in the polymer layer is continuously reduced in the thickness-wise direction from a surface adjoining the polyvalent metal compound-containing layer. Even when such a concentration gradient is provided, excellent gas barrier property can be exhibited so far as the degree of ionic crosslinking in the whole polymer layer is controlled to a prescribed value or higher.

When a formed product (for example, a bag or container) obtained by subjecting such a multi-layer film or a multi-layer film comprising this multi-layer film and other resin layers to folding processing or forming is flexed repeatedly, its oxygen gas barrier property is temporally deteriorated. It has however been found that the multi-layer film is recovered to the original oxygen gas barrier property with time.

It can be considered that even when the gas barrier property is temporally deteriorated by flex fatigue, the gas barrier property is recovered, since the low concentration region of the polyvalent metal salt of the carboxyl group-containing polymer is contained in the polymer layer, and a new ionic bond (polyvalent metal salt) is formed by migration of the polyvalent metal compound into the low concentration region. In addition, the flexibility of the multi-layer film is not impaired because the low concentration region is present, so that its forming and processing ability is improved.

On the other hand, when the carboxyl group-containing polymer is sufficiently and evenly reacted with the polyvalent metal compound in the polymer layer to form the polyvalent metal salt of the carboxyl group-containing polymer, the flexibility of the polymer layer is impaired, and moreover it is difficult to recover the gas barrier property by forming a new ionic bond when the gas barrier property is deteriorated by flex fatigue. The present invention has been led to completion on the basis of these findings.

According to the present invention, there is thus provided a multi-layer film having a layer structure that a polyvalent metal compound-containing layer (B) adjoins one side or both sides of a polymer layer (A) containing a carboxyl group-containing polymer and a polyvalent metal salt of the carboxyl group-containing polymer, wherein (1) the polymer layer (A) has a concentration gradient structure that the concentration of the polyvalent metal salt of the carboxyl group-containing polymer in the polymer layer (A) is continuously reduced in the thickness-wise direction from a surface adjoining the polyvalent metal compound-containing layer (B), and (2) a peak ratio $A_{1560}/A_{1700}$ of the height $A_{1560}$ of an absorption peak at a wave number of 1560 cm$^{-1}$ to the height $A_{1700}$ of an absorption peak at a wave number of 1700 cm$^{-1}$ as determined on the basis of an infrared absorption spectrum of the polymer layer (A) is at least 0.25.

BEST MODE FOR CARRYING OUT THE INVENTION

1. Carboxyl Group-containing Polymer:

The carboxyl group-containing polymer used in the present invention is a polymer having at least 2 carboxyl groups in its molecule and may be called "polycarboxylic acid polymer" in some cases. Typical examples of the carboxyl group-containing polymer include homopolymers of carboxyl group-containing unsaturated monomers, copolymers of carboxyl group-containing unsaturated monomers, copolymers of a carboxyl group-containing unsaturated monomer and any other polymerizable monomer, and polysaccharides (also referred to as "acid polysaccharides") containing a carboxyl group in their molecules.

The carboxyl group includes not only a free carboxyl group, but also an acid anhydride group (specifically, dicarboxylic acid anhydride group). The acid anhydride group may undergo partial ring opening to form a carboxyl group. A part of the carboxyl group may be neutralized with an alkali. In this case, the degree of neutralization is preferably at most 20%.

A graft polymer obtained by graft-polymerizing a carboxyl group-containing unsaturated monomer on a polymer containing no carboxyl group, such as a polyolefin, may also be used as the carboxyl group-containing polymer. A polymer obtained by hydrolyzing a polymer having a hydrolyzable ester group such as an alkoxycarbonyl group (for example, methoxycarbonyl group) to convert the ester group into a carboxyl group may also be used as the carboxyl group-containing polymer.

As the carboxyl group-containing unsaturated monomer, is preferred an α,β-monoethylenically unsaturated carboxylic acid. Accordingly, examples of the carboxyl group-containing polymer include homopolymers of α,β-monoethylenically unsaturated carboxylic acids, copolymers of 2 or more α,β-monoethylenically unsaturated carboxylic acids, and copolymers of an α,β-monoethylenically unsaturated carboxylic acid and any other polymerizable monomer. Ethylenically unsaturated monomers are representative of other polymerizable monomers.

Examples of the α,β-monoethylenically unsaturated carboxylic acids include unsaturated monocarboxylic acids such as acrylic acid, methacrylic acid and crotonic acid; unsaturated dicarboxylic acids such as maleic acid, fumaric acid and itaconic acid; unsaturated dicarboxylic acid anhydrides such as maleic anhydride and itaconic anhydride; and mixtures of 2 or more compounds thereof. Among these, at least one α,β-monoethylenically unsaturated carboxylic acid selected from the group consisting of acrylic acid, methacrylic acid, crotonic acid, maleic acid, fumaric acid and itaconic acid is preferred, with at least one α,β-monoethylenically unsaturated carboxylic acid selected from the group consisting of acrylic acid, methacrylic acid and maleic acid being more preferred.

As examples of the other polymerizable monomers copolymerizable with the α,β-monoethylenically unsaturated carboxylic acid, particularly, ethylenically unsaturated monomers, may be mentioned α-olefins such as ethylene, propylene, 1-butene, 1-pentene, 1-hexene and 1-octene; vinyl esters of saturated carboxylic acids, such as vinyl acetate; alkyl esters of acrylic acid, such as methyl acrylate and ethyl acrylate; alkyl esters of methacrylic acid, such as methyl methacrylate and ethyl methacrylate; chlorine-containing vinyl monomers such as vinyl chloride and vinylidene chloride; fluorine-containing vinyl monomers such as vinyl fluoride and vinylidene fluoride; unsaturated nitriles such as acrylonitrile and methacrylonitrile; aromatic vinyl monomers such as styrene and α-methyl-styrene; and alkyl esters of itaconic acid. These ethylenically unsaturated monomers may be used either singly or in any combination thereof. When the carboxyl group-containing polymer is a copolymer of an α,β-monoethylenically unsaturated carboxylic acid and a vinyl ester of a saturated carboxylic acid, such as vinyl acetate, a copolymer obtained by saponifying the copolymer to convert the saturated carboxylic acid vinyl ester unit into a vinyl alcohol unit may also be used.

As examples of the carboxyl group-containing polysaccharides, may be mentioned acid polysaccharides having a carboxyl group in their molecules, such as alginic acid, carboxymethyl cellulose and pectin. These acid polysaccharides may be used either singly or in any combination thereof. The acid polysaccharide may also be used in combination with a (co)polymer of an α,β-monoethylenically unsaturated carboxylic acid.

When the carboxyl group-containing polymer used in the present invention is a copolymer of an α,β-monoethylenically unsaturated carboxylic acid and any other ethylenically unsaturated monomer, the copolymerization composition thereof is such that the α,β-monoethylenically unsaturated carboxylic acid monomer composition is preferably at least 60 mol %, more preferably at least 80 mol %, particularly preferably at least 90 mol % from the viewpoints of the gas barrier property, hot water resistance and water vapor resistance of the resulting film.

The carboxyl group-containing polymer is preferably a homopolymer or copolymer obtained by polymerization of the α,β-monoethylenically unsaturated carboxylic acid(s) alone in that a film excellent in gas barrier property, moisture resistance, water resistance, hot water resistance and water vapor resistance and also excellent in gas barrier property under high-humidity conditions is easily obtained.

When the carboxyl group-containing polymer is a (co)polymer composed of the α,β-monoethylenically unsaturated carboxylic acid(s) alone, specific preferable examples thereof include homopolymers and copolymers obtained by polymerization of at least one α,β-monoethylenically unsaturated carboxylic acid selected from the group consisting of acrylic acid, methacrylic acid, crotonic acid, maleic acid, fumaric acid and itaconic acid, and mixtures of at least two polymers thereof. Among these, homopolymers and copolymers obtained by polymerization of at least one α,β-monoethylenically unsaturated carboxylic acid selected from the group consisting of acrylic acid, methacrylic acid and maleic acid are more preferred.

Particularly preferable examples of the carboxyl group-containing polymer include polyacrylic acid, polymethacrylic acid, polymaleic acid and mixtures of at least two polymers thereof. As the acid polysaccharide, is preferred alginic acid. Among these, polyacrylic acid is particularly preferred in that it is relatively easily available, and a film excellent in various properties is easily obtained.

No particular limitation is imposed on the molecular weight of the carboxyl group-containing polymer. However, its number average molecular weight is preferably within a range of 2,000 to 10,000,000, more preferably within a range of 5,000 to 1,000,000, still more preferably within a range of 10,000 to 500,000 from the viewpoints of film-forming ability and the physical properties of the resulting film. The number average molecular weight can be measured by gel permeation chromatography (GPC). In the measurement by GPC, the number average molecular weight of the polymer is generally measured in terms of standard polystyrene.

Besides the carboxyl group-containing polymer, other polymers may be mixed and used as polymers making up the film according to the present invention within limits not impeding the properties of the film, such as gas barrier property, hot water resistance and water vapor resistance. In many cases, it is preferable to use the carboxyl group-containing polymer alone.

The carboxyl group-containing polymer used as a raw material is desired to have an oxygen transmission coefficient of preferably at most 1,000 $cm^3 \cdot \mu m/(m^2 \cdot day \cdot MPa)$, more preferably at most 500 $cm^3 \cdot \mu m/(m^2 \cdot day \cdot MPa)$, particularly preferably at most 100 $cm^3 \cdot \mu m/(m^2 \cdot day \cdot MPa)$ as determined in the form of a film formed by itself under dry conditions of a temperature of 30° C. and a relative humidity of 0%. If the oxygen transmission coefficient of the carboxyl group-containing polymer used as a raw material is too low, the resulting multi-layer film according to the present invention tends to exhibit insufficient gas barrier property and stability to hot water and water vapor (hot water resistance and water vapor resistance).

The oxygen transmission coefficient of the carboxyl group-containing polymer used as a raw material can be determined in accordance with the following method. The carboxyl group-containing polymer is dissolved in water to prepare an aqueous solution of a concentration of 10% by weight. This aqueous solution is applied on to a plastic film base by means of a bar coater and dried, thereby producing a coated film with a carboxyl group-containing polymer layer having a dry thickness of 1 μm formed thereon. With respect to the coated film thus obtained, its oxygen transmission rate is measured under conditions of 30° C. and relative humidity of 0%. As the plastic film base, is used a plastic film having a relatively high oxygen transmission rate. When the oxygen transmission rate of the resultant coated film having the dry coating film of the carboxyl group-containing polymer is at most a tenth of the oxygen transmission rate of the single plastic film used as the base, the measured value of the oxygen transmission rate can be substantially regarded as the oxygen transmission rate of the carboxyl group-containing polymer layer alone.

Since the measured value obtained in the above-described manner is a value of the oxygen transmission rate of the carboxyl group-containing polymer layer having a thickness of 1 μm, it can be transformed into an oxygen transmission coefficient by multiplying the measured value by 1 μm. The oxygen transmission rate can be measured by means of, for example, an oxygen transmission tester "OXTRAN 2/20" manufactured by Modern Control Co. The measuring method of the oxygen transmission rate is carried out in accordance with ASTM D 3985-81 [corresponding to the B method (equal pressure method) prescribed in JIS K 7126]. The measured value can be indicated by unit $cm^3(STP)/(m^2 \cdot day \cdot MPa)$. Since STP means standard conditions (0° C., 1 atm) for defining the volume of oxygen, the unit may be indicated by omitting STP.

2. Polyvalent Metal Compound:

Examples of the polyvalent metal compound used in the present invention include simple substances and compounds of polyvalent metal atoms, whose metal ion has a di or higher valence. Accordingly, polyvalent metal compounds used in the present invention also include simple substances of polyvalent metal atoms. As specific examples of polyvalent metals, may be mentioned metals of Group 2A of the periodic table, such as beryllium, magnesium and calcium; transition metals such as titanium, zirconium, chromium, manganese, iron, cobalt, nickel, copper and zinc; and aluminum. However, the polyvalent metals are not limited thereto.

Specific examples of the polyvalent metal compounds include oxides, hydroxides, carbonates, organic acid salts and inorganic acid salts of the polyvalent metals. However, the polyvalent metal compounds are not limited thereto. Examples of the organic acid salts include acetates, oxalates, citrates, lactates, phosphates, phosphites, hypophosphites, stearates and monoethylenically unsaturated monocarboxylates. However, the organic acid salts are not limited thereto. Examples of the inorganic acid salts include chlorides, sulfates and nitrates. However, the inorganic acid salts not limited thereto. Alkylalkoxides of polyvalent metals may also be used as the polyvalent metal compounds. These polyvalent metal compounds may be used either singly or in any combination thereof.

Among the polyvalent metal compounds, compounds of beryllium, magnesium, calcium, copper, cobalt, nickel, zinc, aluminum and zirconium are preferred from the viewpoints of dispersion stability in a coating liquid and the gas barrier property of a multi-layer film to be formed, with compounds of divalent metals such as beryllium, magnesium, calcium, copper, zinc, cobalt and nickel being more preferred.

As preferable examples of divalent metal compounds, may be mentioned oxides such as zinc oxide, magnesium oxide, copper oxide, nickel oxide and cobalt oxide; carbonates such as calcium carbonate; organic acid salts such as calcium lactate, zinc lactate and calcium acrylate; and alkoxides such as magnesium methoxide. However, the divalent metal compounds are not limited thereto.

The polyvalent metal compound is used in the form of a solution or dispersion. Such a solution or dispersion is used as a coating liquid. The coating liquid contains the polyvalent metal compound, but may be a paint additionally containing a resin component.

When the polyvalent metal compound is used in the form of particles in the coating liquid, the average particle diameter of the particles is preferably within a range of 10 nm to 10 μm, more preferably within a range of 12 nm to 1 μm, still more preferably within a range of 15 to 500 nm, particularly preferably within a range of 15 to 50 nm.

3. Production Process of Multi-layer Film:

The multi-layer film according to the present invention can be produced by a process, in which at least one carboxyl group-containing polymer layer and at least one polyvalent metal compound-containing layer are formed adjacently to each other on a base (support) by a coating method. The polyvalent metal compound migrates from the polyvalent metal compound-containing layer into the carboxyl group-containing polymer layer to form a polyvalent metal salt with the carboxyl group in the carboxyl group-containing polymer there, thereby introducing an ionic bond (i.e., ionic crosslinking).

Although it is necessary for the carboxyl group-containing polymer layer to adjoin the polyvalent metal compound-containing layer, the number of the respective layers arranged may be suitably determined as needed. When the carboxyl group-containing polymer layer and the polyvalent metal compound-containing layer are indicated as A and B, respectively, specific examples of multi-layer structures include A/B, B/A/B and A/B/A. Of course, multi-layer structures having at least 4 layers, such as A/B/A/B, B/A/B/A and B/A/B/A/B, may also be adopted.

As the base, is preferably used a plastic film. No particular limitation is imposed on the kind of a plastic forming the plastic film. As examples thereof, may be mentioned olefin polymers such as high density polyethylene, medium density polyethylene, low density polyethylene, linear low density polyethylene, polypropylene, poly(4-methylpentene) and cyclic polyolefins, and acid-modified products thereof; vinyl acetate polymers such as polyvinyl acetate, ethylene-vinyl acetate copolymers, saponified products of ethylene-vinyl acetate copolymers and polyvinyl alcohol, and modified products thereof; polyesters such as polyethylene terephthalate, polybutylene terephthalate and polyethylene naphthalate; aliphatic polyesters such as poly(ε-caprolactone), polyhydroxybutyrate and polyhydroxyvalerate; polyamides such as nylon 6, nylon 66, nylon 12, nylon 6/66 copolymers, nylon 6/12 copolymers and meta-xyleneadipamide-nylon 6 copolymers; polyethers such as polyethylene glycol, poly(ether sulfone), poly(phenylene sulfide) and poly(phenylene oxide); halogenated polymers such as polyvinyl chloride, polyvinylidene chloride, polyvinyl fluoride and polyvinylidene fluoride; acrylic polymers such as polymethyl acrylate, polyethyl acrylate, polymethyl methacrylate, polyethyl methacrylate and polyacrylonitrile; polyimide resins; and besides resins used for paints, such as alkyd resins, melamine resins, acrylic resins, pyroxylin, urethane resins, unsaturated polyester resins, phenol resins, amino resins, fluorocarbon resins and epoxy resins; and natural polymeric compounds such as cellulose, starch, pullulan, chitin, chitosan, glucomannan, agarose and gelatin.

The base is preferably an unoriented film or oriented film formed of any one of these plastics. As the base, may also be used that obtained by forming a thin film of an inorganic compound such as silicon oxide, aluminum oxide, aluminum or silicon nitride; a metal compound; or the like on the surface of the film (including a sheet) formed of the plastic by a vapor deposition method sputtering method or ion plating method.

In order to form the carboxyl group-containing polymer layer, a coating liquid comprising the carboxyl group-containing polymer and a solvent is prepared, and this coating liquid is applied on to the base or the polyvalent metal compound-containing layer and dried. No particular limitation is imposed on the solvent so far as it can uniformly dissolve or disperse the carboxyl group-containing polymer therein. As specific examples thereof, may be mentioned water; alcohols such as methyl alcohol, ethyl alcohol and isopropyl alcohol; and polar organic solvents such as dimethyl sulfoxide, N,N-dimethylformamide and N,N-dimethylacetamide.

No particular limitation is imposed on the concentration of the carboxyl group-containing polymer in the coating liquid comprising the carboxyl group-containing polymer and the solvent. However, it is desirable that the concentration be within a range of preferably 0.1 to 50% by weight, more preferably 1 to 40% by weight, particularly preferably 5 to 30% by weight from the viewpoints of the stability, uniformly-coating ability and easy coating operation of the coating liquid. Into the coating liquid comprising the carboxyl group-containing polymer, additive components such as other polymers, softening agents, stabilizers, anti-blocking agents, pressure-sensitive adhesives, inorganic lamellar compounds typified by montmorillonite, colorants and ultraviolet absorbents may be suitably added within limits not impeding the gas barrier property as needed. It is desirable that the amount added be preferably at most 5% by weight, more preferably at most 3% by weight, particularly preferably at most 1% by weight in terms of the total amount of the additives based on the weight of the carboxyl group-containing polymer.

The polyvalent metal compound-containing layer can be formed by applying a coating liquid comprising the polyvalent metal compound on to the base or the carboxyl group-containing polymer layer and drying it. The coating liquid comprising the polyvalent metal compound can be prepared by dissolving or dispersing the polyvalent metal compound in a solvent.

No particular limitation is imposed on the solvent so far as it can uniformly dissolve or disperse the polyvalent metal compound therein. As specific examples thereof, may be mentioned water; alcohols such as methyl alcohol, ethyl alcohol, isopropyl alcohol, n-propyl alcohol, n-butyl alcohol and n-pentyl alcohol; ketones such as acetone and methyl ethyl ketone; ethers such as diethyl ether, dioxane and tetrahydrofuran; esters such as ethyl acetate and butyl acetate; polar organic solvents such as dimethyl sulfoxide, N,N-dimethylacetamide, N,N-dimethylformamide, N-methyl-2-pyrrolidone, tetramethylurea, hexamethylphosphoric triamide and γ-butyrolactone; and hydrocarbons such as toluene, hexane, heptane and cyclohexane. These solvents may be used either singly or in any combination thereof.

Into the coating liquid comprising the polyvalent metal compound, resin components and additives such as dispersing agents, surfactants, softening agents, stabilizers, film-forming agents, anti-blocking agents and pressure-sensitive adhesives may be suitably added as needed. A resin component soluble in the solvent used is preferably contained from the viewpoint of improving the dispersibility of the polyvalent metal compound and the coating property of the coating liquid.

As examples of the resin component added to the coating liquid comprising the polyvalent metal compound, may be mentioned general-purpose binder resins for paints, such as alkyd resins, melamine resins, acrylic resins, pyroxylin, urethane resins, polyester resins, phenol resins, amino resins, fluorocarbon resins and epoxy resins. These resins are resins containing no carboxyl group reacting with the polyvalent metal compound. The total amount (concentration) of the polyvalent metal compound, resin component and other additives in the coating liquid is desirably within a range of preferably 1 to 50% by weight, more preferably 3 to 45% by weight, particularly preferably 5 to 40% by weight from the viewpoints of the stability and easy coating operation of the coating liquid.

Upon the application of the coating liquid comprising the carboxyl group-containing polymer or the coating liquid comprising the polyvalent metal compound on to the base, an adhesive (primer) may be applied on to the surface of the base for the purpose of improving adhesion between the carboxyl group-containing polymer layer or polyvalent metal compound-containing layer and the base. No particular limitation is imposed on the kind of the adhesive. As specific examples thereof, may be mentioned solvent-soluble alkyd resins, melamine resins, acrylic resins, pyroxylin, urethane resins, polyester resins, phenol resins, amino resins, fluorocarbon resins and epoxy resins used for dry lamination, anchor coating and primer coating.

The respective coating liquids are applied on to the base in such a manner that the carboxyl group-containing polymer layer and the polyvalent metal compound-containing layer are arranged adjacently to each other, and are dried.

In this case, a process, in which one coating liquid is applied and dried, and the other coating liquid is then applied thereto and dried, is adopted. As a layer structure, may be adopted any of the above-described layer structures. As preferable layer structures including a base layer, for example, when the base layer, the carboxyl group-containing polymer layer and the polyvalent metal compound-containing layer are indicated as "Base", A and B, respectively, specific examples of multi-layer structures include "Base/A/B" (Base 1/Carboxyl group-containing polymer layer 2/Polyvalent metal compound-containing layer 3) illustrated in FIG. 1, "Base/B/A/B" (Base 21/Polyvalent metal compound-containing layer 22/Carboxyl group-containing polymer layer 23/Polyvalent metal compound-containing layer 24) illustrated in FIG. 2, and "Base/A/B/A". Of course, A and B may also be arranged alternately and repeatedly in such a manner that still more layers are formed. The above-described adhesive layer may also be arranged for the purpose of improving adhesion between the base and a coating film formed thereon.

As a method for applying the respective coating liquids, may be adopted any of a spraying method, a dipping method, a coating method using a coater and a printing method by a printing machine. When the coating liquids are applied by means of a coater or printing machine, various systems such as a gravure coater of the direct gravure system, reverse gravure system, kiss gravure system, offset gravure system or the like; a reverse-roll coater, a micro-gravure coater, an air-knife coater, a dip coater, a bar coater, a comma coater, and a die coater may be adopted.

No particular limitation is imposed on a drying method for the coating film, and any method may be used so far as the solvent can be evaporated to obtain a solid layer. Examples thereof include a method by air drying, a method by drying in an oven set to a prescribed temperature, and a method making use of any other drying means. As other drying means, dryers attached to various kinds of coaters, such as an arch dryer, a floating dryer, a drum dryer and an infrared dryer are representative. Drying conditions may be optionally set within limits not damaging the coating film, film, base and the like by heat. The drying is continued until the solvent in the coating film is substantially removed.

No particular limitation is imposed on the dry thickness of the carboxyl group-containing polymer layer. However, it is within a range of generally 0.001 μm to 1 mm, preferably 0.01 to 100 μm, more preferably 0.1 to 10 μm, particularly preferably 0.5 to 5 μm from the viewpoints of forming ability upon the formation of a film and handling property of the film. The dry thickness of the polyvalent metal compound-containing layer is within a range of generally 0.001 μm to 1 mm, preferably 0.01 to 100 μm, more preferably 0.1 to 10 μm.

After the respective layers are formed on the base, the polyvalent metal compound is caused to migrate from the polyvalent metal compound-containing layer into the carboxyl group-containing polymer layer adjoining it to form a polyvalent metal salt of the carboxyl group-containing polymer, thereby converting the carboxyl group-containing polymer layer into "a polymer layer (A) containing the carboxyl group-containing polymer and the polyvalent metal salt of the carboxyl group-containing polymer". Since the migration of the polyvalent metal compound includes migration in the form of a polyvalent metal ion, it is referred to as "migration of the polyvalent metal ion" hereinafter.

The migration of the polyvalent metal ion may be conducted by leaving the multi-layer film to stand for a long period of time under ordinary temperature and ordinary humidity. In order to accelerate the migration of the polyvalent metal ion and form a desired concentration gradient structure of the polyvalent metal salt of the carboxyl group-containing polymer, which has a desired level of gas barrier property (oxygen gas transmission rate or oxygen gas transmission coefficient) prior to secondary forming process of the multi-layer film, however, it is desirable to conduct aging (humidity conditioning treatment) under an atmosphere controlled to prescribed humidity and temperature.

As an aging method, is mentioned a method in which the multi-layer film is left to stand under an atmosphere of a relative humidity of generally at least 20%, preferably 40 to 100%, more preferably 60 to 100% and a temperature of generally 5° C. to 200° C., preferably 20° C. to 150° C., more preferably 30° C. to 130° C. The aging is conducted in a gas phase or liquid phase controlled to the above-described conditions. Aging time is suitably controlled according to the relative humidity and temperature and is up to the time the desired gas barrier property is achieved, and the desired concentration gradient structure is formed. However, the aging time is preferably within 10 days, more preferably within 5 days, still more preferably within 2 days. The pressure upon the aging may be suitably selected from a range of 0.001 MPa (0.01 atm) to 1,000 MPa (10,000 atm).

4. Multi-layer Film:

The multi-layer films according to the present invention require that the polymer layer (A) containing the carboxyl group-containing polymer and the polyvalent metal salt of the carboxyl group-containing polymer has a concentration gradient structure that the concentration of the polyvalent metal salt of the carboxyl group-containing polymer in the polymer layer (A) is continuously reduced in the thickness-wise direction from a surface adjoining the polyvalent metal compound-containing layer (B).

The concentration gradient structure can be identified by, for example, conducting image observation through a transmission electron microscope (TEM) or scanning electron microscope (SEM) to determine measuring points and measuring an elemental composition distribution in the thickness-wise direction of a section of the film [polymer layer (A)] by energy dispersive X-ray spectroscopy (EDX). When the thickness of the polymer layer (A) is about 5 μm or smaller, it is preferable to conduct the image observation through TEM and identify the elemental composition distribution by EDX from the viewpoints of space resolution and preparation of an observation sample.

Figure 3:
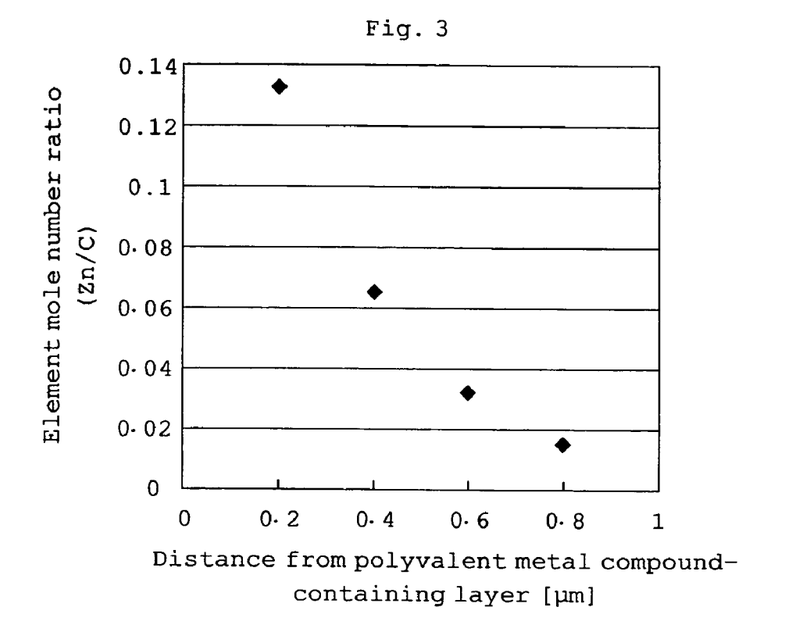
FIG. 3 diagrammatically illustrates an exemplary concentration distribution of zinc in a polyacrylic acid layer according to TEM-EDX measurement.
Figure 4:
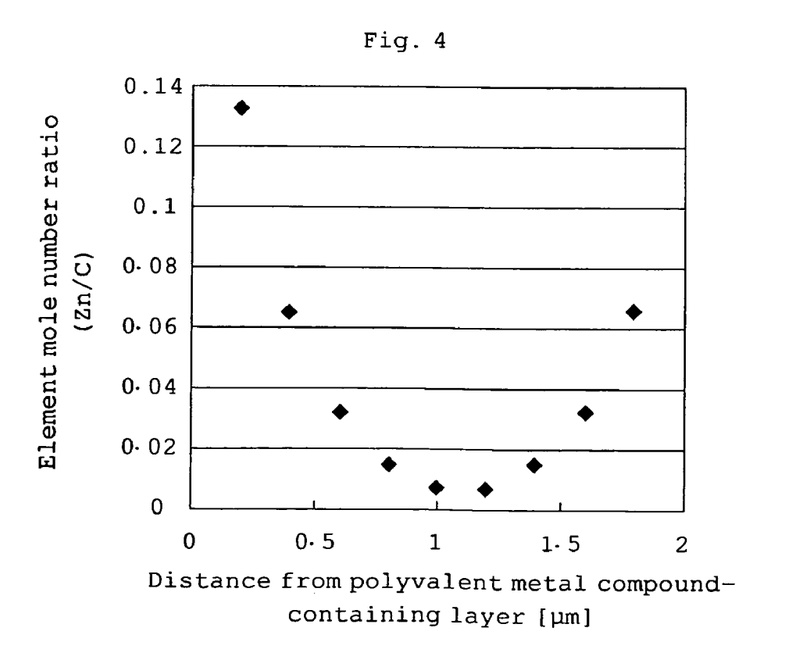
FIG. 4 diagrammatically illustrates another exemplary concentration distribution of zinc in a polyacrylic acid layer according to TEM-EDX measurement.

A ratio M/C of the number M of polyvalent metal atoms to the number C of carbon atoms at a measuring point can be determined by the EDX measurement. When a graph is prepared with a distance in the thickness-wise direction from the adjoining polyvalent metal compound-containing layer and an element mole number ratio M/C taken on an axis of abscissa and an axis of ordinate, respectively, and the M/C values are plotted on the graph, for example, such concentration gradient structures as illustrated in FIGS. 3 and 4 can be observed. The polyvalent metal element in the polymer layer (A) forms a salt with the carboxyl group in the carboxyl group-containing polymer, and the concentration distribution of the polyvalent metal element in the thickness-wise direction indicates a concentration distribution of the polyvalent metal salt of the carboxyl group-containing polymer in the polymer layer (A).

When the carboxyl group-containing polymer layer and the polyvalent metal compound-containing layer are represented by A and B, respectively, FIG. 3 indicates the case of a layer structure of "A/B", and FIG. 4 indicates the case of a layer structure of "B/A/B".

When the above-described aging treatment is caused to progress to excess, the concentration gradient structure is impaired. The polymer layer (A) of the multi-layer film according to the present invention has the concentration gradient structure of the polyvalent metal salt of the carboxyl group-containing polymer and the low concentration region, whereby the deterioration of flexibility of the polymer layer attending upon the crosslinking by the metal ion can be prevented to improve the secondary processing ability of the multi-layer film. In addition, even when the oxygen gas barrier property is temporally deteriorated by subjecting the multi-layer film to folding processing, or subjecting a formed product formed from the multi-layer film to flex fatigue, the gas barrier property is recovered, since the low concentration region is present, and the polyvalent metal ion migrates into the low concentration region.

As described above, the polymer layer (A) has the concentration gradient structure of the polyvalent metal salt of the carboxyl group-containing polymer, and the low concentration region is thereby present, whereby the multi-layer film can reconcile the processing ability with the gas barrier property.

The concentration gradient structure of the polymer layer (A) preferably has a low concentration region of the polyvalent metal salt of the carboxyl group-containing polymer, whose element mole number ratio [metal element (n valence)/C element] calculated out on the basis of the result of the elemental composition analysis in the thickness-wise direction by the energy dispersive X-ray spectroscopy falls within a range of 0 to 0.06/n, in a proportion of 5 to 80% in terms of a thickness percentage of the polymer layer (A). The element mole number ratio of the low concentration region is within a range of preferably 0 to 0.05/n, more preferably 0 to 0.04/n. The thickness percentage of the low concentration region is within a range of preferably 5 to 70%, more preferably 5 to 60%. The low concentration region particularly preferably contains a region, whose element mole number ratio is within a range of 0 to 0.04/n, in which the polyvalent metal salt of the carboxyl group-containing polymer is substantially not present, in a range of 5 to 30% in terms of a thickness percentage of the polymer layer (A).

On the other hand, from the viewpoints of gas barrier property, water resistance, hot water resistance and water vapor resistance, the concentration gradient structure of the polymer layer (A) desirably has a high concentration region of the polyvalent metal salt of the carboxyl group-containing polymer, whose element mole number ratio [metal element (n valence)/C element] calculated out on the basis of the result of the elemental composition analysis in the thickness-wise direction by the energy dispersive X-ray spectroscopy falls within a range of from higher than 0.06/n to not higher than 0.33/n, in a proportion of 20 to 95% in terms of a thickness percentage of the polymer layer (A) adjoining the polyvalent metal compound-containing layer (B). The element mole number ratio of the high concentration region is within a range of preferably 0.07 to 0.33/n, more preferably 0.08 to 0.33/n. The thickness percentage of the high concentration region is within a range of preferably 20 to 80%, more preferably 20 to 70%.

From the viewpoints of gas barrier property, water resistance, hot water resistance and water vapor resistance, the multi-layer film according to the present invention is preferably such that a peak ratio $A_{1560}/A_{1700}$ of the height $A_{1560}$ of an absorption peak at a wave number of 1560 cm$^{-1}$ to the height $A_{1700}$ of an absorption peak at a wave number of 1700 cm$^{-1}$ as determined on the basis of an infrared absorption spectrum of the polymer layer (A) is at least 0.25. This peak ratio is more preferably at least 0.30, particularly preferably at least 0.40. A determination method of this peak ratio will be described in EXAMPLES.

This peak ratio is an index indicating the degree of ionization by the polyvalent metal compound. If this peak ratio is too low, it is difficult to achieve sufficient gas barrier property, water resistance, hot water resistance and water vapor resistance upon processing of the multi-layer film into a product.

The multi-layer film according to the present invention is also preferably such that a chemical equivalent of the polyvalent metal compound to the carboxyl group, which is calculated out on the basis of the total (At) of the carboxyl group contained in the whole carboxyl group-containing polymer layer (A) and the total (Bt) of the polyvalent metal compound contained in the whole carboxyl group-containing polymer layer (A) and the whole polyvalent metal compound-containing layer (B), is at least 1.0. This chemical equivalent is desirably within a range of preferably 1.0 to 10.0, more preferably 1.0 to 5.0 from the viewpoint of the forming and processing ability and transparency of the multi-layer film.

The total of the carboxyl group also includes other forms such as a carboxyl group converted into a polyvalent metal carboxylate, in addition to a free carboxyl group. Likewise, the total of the polyvalent metal compound also includes that converted into a polyvalent metal carboxylate. These calculations are made on all layers of the multi-layer structure.

The chemical equivalent can be determined, for example, in the following manner. Description is given herein taking, as an example, the case where the carboxyl group-containing polymer is polyacrylic acid, and the polyvalent metal compound is magnesium oxide. When the mass of polyacrylic acid is 100 g, the amount of a carboxyl group in 100 g of polyacrylic acid is 1.39 mol, since the molecular weight of monomer unit of polyacrylic acid is 72, and one carboxyl group is contained in a molecule of the monomer. At this time, 1.0 chemical equivalent to 100 g of polyacrylic acid means an amount of a base required to neutralize 1.39 mol of the carboxyl group. When magnesium oxide is used in a proportion of 1.0 chemical equivalent to 100 g of polyacrylic acid, it is only necessary to use magnesium oxide in an amount required to neutralize 1.39 mol of the carboxyl group. since the valence of magnesium is 2, and the molecular weight of magnesium oxide is 40, the 1.0 chemical equivalent of magnesium oxide to 100 g of polyacrylic acid is 27.8 g (0.695 mol).

Even when the oxygen gas barrier property of the multi-layer film according to the present invention is deteriorated by folding processing or flex fatigue, the oxygen gas barrier property can be recovered by the aging treatment. More specifically, after the multi-layer film formed into a cylindrical form is used as a sample to conduct a flex test of 150 Gelvo flexings by means of a Gelvo tester under conditions of a temperature of 5° C. and a relative humidity of 10% in accordance with the provisions of ASTM F 392, the sample is aged for 20 hours under an environment of a temperature of 30° C. and a relative humidity of 80%. At this time, it is desirable that the oxygen transmission rate of the sample after the aging as measured under conditions of a temperature of 30° C. and a relative humidity of 0% in accordance with ASTM D 3985-81 be retained preferably within ±50%, more preferably within ±30%, particularly preferably within ±10% of the oxygen transmission rate of the sample before the flex test.

The multi-layer film according to the present invention desirably has gas barrier property that the oxygen transmission rate thereof is preferably at most 1,000 cm$^3$(STP)/ (m$^2$·day·MPa), more preferably at most 500 cm$^3$(STP)/ (m$^2$·day·MPa), particularly preferably at most 100 cm$^3$(STP)/ (m$^2$·day·MPa) even under both conditions of a temperature of 30° C. and a relative humidity of 0%, and a temperature of 30° C. and a relative humidity of 80%.

In the multi-layer film according to the present invention, the base can be removed from the film as needed. When the multi-layer film is used for a packaging material, it is often used as a multi-layer film containing the base. On the multi-layer film according to the present invention, one or more other resin layers may be arranged by a lamination method or coating method as needed. As other resin layers, may be mentioned layers of the resins used as the base. However, the layers are not limited thereto, and various resin layers that can impart desired properties such as heat sealability, abrasion resistance and heat resistance may be arranged. Further, one or more layers formed of a metal foil, silicon oxide or the like may be formed on the multi-layer film according to the present invention by a lamination method or vapor deposition method.

The multi-layer films according to the present invention are suitable for use as packaging materials for foods, drinks, drugs, medicines, electronic parts, etc. that tend to undergo deterioration by oxygen. The multi-layer films according to the present invention are suitable for use as materials for packaging containers such as bottles, cups, trays, tubes and bags. Secondary forming and processing into such containers may be optionally conducted by heat sealing, sheet forming (vacuum forming and/or pressure forming) and/or the like. Even when the multi-layer film according to the present invention is subjected to folding processing upon forming processing, the gas barrier property can be recovered with time. Formed products such as containers, which are formed with the multi-layer films according to the present invention, can retain the gas barrier property at a high level even under flex fatigue.

EXAMPLES

The present invention will hereinafter be described more specifically by the following Examples and Comparative Example. Measuring methods and evaluating methods of physical properties and properties or characteristics in the present invention are as follows.

(1) Infrared Absorption Spectrometry:

An infrared absorption spectrum was measured by an attenuated total reflection method (ATR method) using FTIR 8200 manufactured by Shimadzu Corporation. A peak height ratio $A_{1560}/A_{1700}$ was determined on the basis of the infrared absorption spectrum of the film. Here, $A_{1560}$ is an absorption peak height of an infrared absorption spectrum attributable to a C=O stretching vibration in the vicinity of a wave number of 1560 cm$^{-1}$ assigned to a salt (—COO$^-$) of a carboxyl group. In other words, the C=O stretching vibration assigned to the carboxylate (—COO$^-$) generally gives an absorption peak having an absorption maximum in the vicinity of 1560 cm$^{-1}$ to an infrared ray wave number region of from 1600 cm$^{-1}$ to 1500 cm$^{-1}$.

$A_{1700}$ is an infrared absorption peak separated and independent of the above $A_{1560}$ and an absorption peak height of an infrared absorption spectrum attributable to a C=O stretching vibration in the vicinity of a wave number of 1700 cm$^{-1}$ assigned to a carboxyl group (—COOH). In other words, the C=O stretching vibration assigned to the carboxyl group (—COOH) gives an absorption peak having an absorption maximum in the vicinity of 1700 cm$^{-1}$ to an infrared ray wave number region of from 1800 cm$^{-1}$ to 1600 cm$^{-1}$.

The absorbance of a film has a proportional relation to an amount of a chemical species having infrared activity, which is present in the film. Accordingly, the peak ratio $A_{1560}/A_{1700}$ of the infrared absorption spectrum may be used as an index indicating a quantitative ratio of the carboxylate (—COO$^{-1}$) with the carboxyl group of the carboxyl group-containing polymer formed with the polyvalent metal in the film to the free carboxyl group (—COOH). This ratio is also an index indicating the degree of ionization.

(2) Oxygen Transmission Rate:

An oxygen transmission rate of a film was measured under conditions of a temperature of 30° C. and a relative humidity of 0% by means of an oxygen transmission tester, Oxtran 2/20 manufactured by Modern Control Co. The measurement was carried out in accordance with ASTM D 3985-81 (corresponding to the B method of JIS K 7126). The unit of the measured value is cm$^3$(STP)/(m$^2$·day·MPa). "STP" means standard conditions (0° C., 1 atm) for defining the volume of oxygen.

The oxygen transmission rate was measured before and after a flex test, which will be described subsequently. After the flex test, a sample was aged for 20 hours under an environment of a temperature of 30° C. and a relative humidity of 80%. With respect to this aged sample (humidity conditioned sample), the oxygen transmission rate was measured likewise.

(3) Flex Test:

A flex test was carried out by means of a Gelvo tester under conditions of a temperature of 5° C. and a relative humidity of 10% in accordance with the provisions of ASTM F 392. The test is a method that a process of twisting a film formed into a cylindrical form and further compressing it is repeated, and was used as a testing method for resistance to flex fatigue. Specifically, a multi-layer film formed into a cylindrical form was used as a sample to conduct a flex test of 150 Gelvo flexings by means of a Gelvo tester under the above-described conditions.

(4) Measurement of Concentration Gradient Structure:

A multi-layer film intended to be observed was embedded in an epoxy resin (product of NISSHIN-EM CORPORATION, trade name "Quentol 812"). This embedded sample was trimmed into an about 0.5-by-0.5 mm square to obtain an ultrathin section by means of an ultramicrotome (manufactured by Reichert-Nissei Co., trade name "ULTRACUT. N"). The thickness of this ultrathin section was about 100 nm.

Image observation of the thus-obtained ultrathin section through an transmission electron microscope (TEM) was conducted by means of a transmission electron microscope, HF-2000 manufactured by Hitachi Ltd. to determine measuring points. An elemental composition distribution in the thickness-wise direction of a section of the film was measured by energy dispersive X-ray spectroscopy (EDX). Measuring conditions of the energy dispersive X-ray spectroscopy are as follows.

Measuring apparatus: elemental analyzer, VOYAGER III manufactured by NORAN Co.,
X-ray detector: Si/Li semiconductor detector,
Energy resolution: 137 eV,
X-ray take-off angle: 22° (side take up system),
Acceleration voltage: 200 kV,
Beam diameter: about 1 nm, and
Incorporation time: for 30 seconds.

The concentration distribution of a polyvalent metal element component in the polymer layer containing the carboxyl group-containing polymer and the polyvalent metal salt of the carboxyl group-containing polymer was evaluated by a ratio M/C of the number M of polyvalent metal atoms to the number C of carbon atoms.

The polyvalent metal element in the polymer layer forms a salt with the carboxyl group, and the concentration distribution of a polyvalent metal element in the thickness-wise direction indicates a concentration distribution of the polyvalent metal salt of the carboxyl group-containing polymer in the polymer layer. Namely, the ratio M/C of the number M of polyvalent metal atoms to the number C of carbon atoms was used for identifying the gradient structure.

Example 1

An aqueous solution of polyacrylic acid (product of Toagosei Chemical Industry Co., Ltd., trade name "Aron™ A-10H", concentration: 25% by weight, number average molecular weight: 200,000) was diluted with distilled water to prepare an aqueous solution of polyacrylic acid (PAA) having a concentration of 10% by weight. The thus-obtained aqueous solution was applied on to an oriented polyethylene terephthalate film (PET film, product of Toray Industries, Inc., trade name "Lumirror™ S10", thickness: 12 μm, heat shrink: 0.5% as measured by dipping for 30 seconds in hot water of 90° C.) by means of a bar coater (manufactured by RK PRINT-COAT INSTRUMENT Co., trade name "K303 PROOFER™", and a coating film was dried by a dryer. The dry coating weight of polyacrylic acid was 0.90 g/m$^2$, and the dry thickness of the coating film was 1.0 μm.

The thus-obtained PAA film was coated with an ultrafine particulate zinc oxide-containing paint (product of Sumitomo Osaka Cement Co., Ltd., trade name "ZR133", total nonvolatile component: 33% by weight, zinc oxide ultrafine particles:

18% by weight) by means of the same bar coater as described above, and a coating film was dried to produce a multi-layer film having a layer structure of "PET/PAA/ZnO-containing layer". The dry coating weight of the ultrafine particulate zinc oxide-containing paint was 2.7 g/m², and the dry thickness of the coating film was 1.5 μm. A resin component of this paint was an unsaturated polyester resin and contains an isocyanate compound as a hardening agent and a phosphate surfactant.

Figure 1:
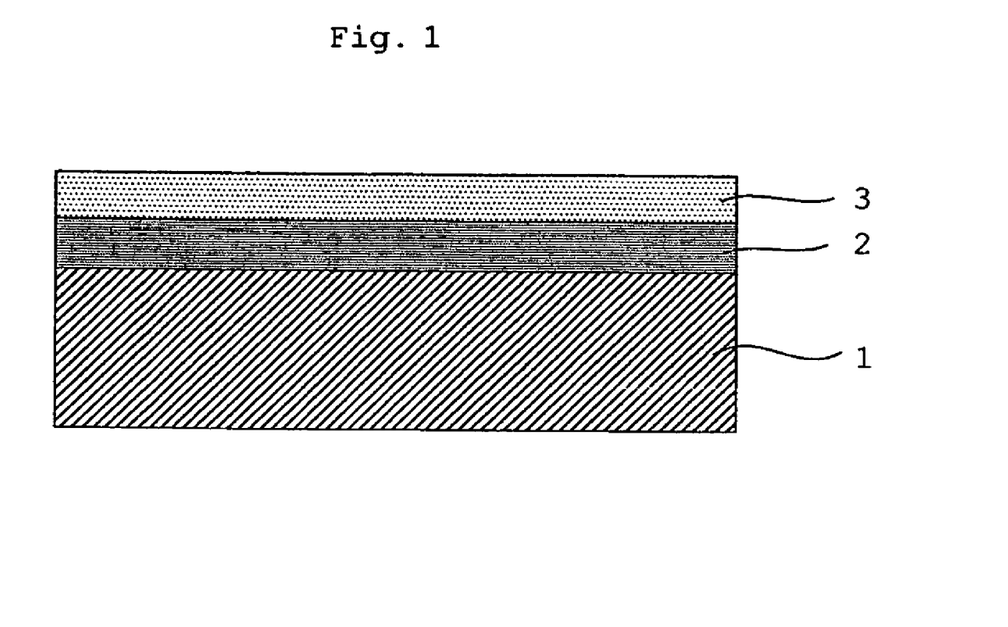
FIG. 1 is a cross-sectional view illustrating an exemplary layer structure of a multi-layer film.

This multi-layer film was left at rest for 24 hours in a thermohygrostat controlled to an atmosphere of a temperature of 30° C. and a relative humidity of 80% to cause a Zn ion to migrate into the PAA film, thereby forming a zinc salt of PAA by a solid phase reaction. This multi-layer film has a layer structure composed of Base 1, Carboxyl group-containing polymer layer 2 and Polyvalent metal compound-containing layer 3 as illustrated in FIG. 1.

With respect to the multi-layer film obtained in such a manner, its peak ratio $A_{1560}/A_{1700}$, oxygen transmission rate and zinc concentration distribution in the thickness-wise direction of the PAA film were measured. The measured results are shown in Table 1.

The concentration distribution of zinc is illustrated in FIG. 3 by plotting a value of an element mole number ratio (Zn/C) against a distance in the thickness-wise direction from the metal compound-containing layer. As apparent from FIG. 3, the concentration of zinc in the PAA layer indicates a concentration gradient structure that the concentration is continuously reduced in the thickness-wise direction from a surface adjoining the ZnO-containing layer. This measured result indicates that the PAA layer has a concentration gradient structure that the concentration of the polyvalent metal salt of the carboxyl group-containing polymer in the PAA layer is continuously reduced in the thickness-wise direction from the surface adjoining the polyvalent metal compound-containing layer.

The oxygen transmission rate was measured as to the multi-layer film before and after the flex test. After the multi-layer film sample was subjected to the flex test of 150 Gelvo flexings by means of the Gelvo tester, the sample was aged for 20 hours under an environment of a temperature of 30° C. and a relative humidity of 80%, and the oxygen transmission rate of this aged sample was also measured.

The oxygen transmission rate of the multi-layer film sample prepared above was also measured under conditions of a temperature of 30° C. and a relative humidity of 80%. As a result, the oxygen transmission rate [cm³ (STP)/(m²·day·MPa)] was 15 before the flex fatigue test, 52 after the flex fatigue test and 30 after the humidity conditioning after the flex fatigue test. Accordingly, it is found that the multi-layer film according to the present invention exhibits excellent oxygen gas barrier property even under the high-humidity conditions.

Example 2

An ultrafine particulate zinc oxide-containing paint (product of Sumitomo Osaka Cement Co., Ltd., trade name "ZR133") was applied on to a PET film (product of Toray Industries, Inc., trade name "Lumirror™S10") by means of a bar coater (manufactured by RK PRINT-COAT INSTRUMENT Co., trade name "K303 PROOFER™", and a coating film was dried by a dryer. The dry coating weight of the ultrafine particulate zinc oxide-containing paint was 2.4 g/m², and the dry thickness of the coating film was 1.3 μm.

On the other hand, an aqueous solution of polyacrylic acid (product of Toagosei Chemical Industry Co., Ltd., trade name "Aron™ A-10H") was diluted with distilled water to prepare an aqueous solution of PAA having a concentration of 10% by weight. The aqueous solution of PAA was applied on to the ZnO-containing layer formed above by means of the same bar coater as described above, and a coating film was dried to produce a multi-layer film having a layer structure of "PET/ZnO-containing layer/PAA". The dry coating weight of PAA was 1.8 g/m², and the dry thickness of the coating film was 2.0 μm.

The same ultrafine particulate zinc oxide-containing paint as described above was further applied on to the PAA layer of the multi-layer film by means of the bar coater, and a coating film was dried to produce a multi-layer film having a layer structure of "PET/ZnO-containing layer/PAA/ZnO-containing layer". The dry coating weight of the ultrafine particulate zinc oxide-containing paint was 2.4 g/m², and the dry thickness of the coating film was 1.3 μm.

This multi-layer film was left at rest for 24 hours in a thermohygrostat controlled to an atmosphere of a temperature of 30° C. and a relative humidity of 80% to cause a Zn ion to migrate into the PAA film, thereby forming a zinc salt of PAA by a solid phase reaction.

Figure 2:
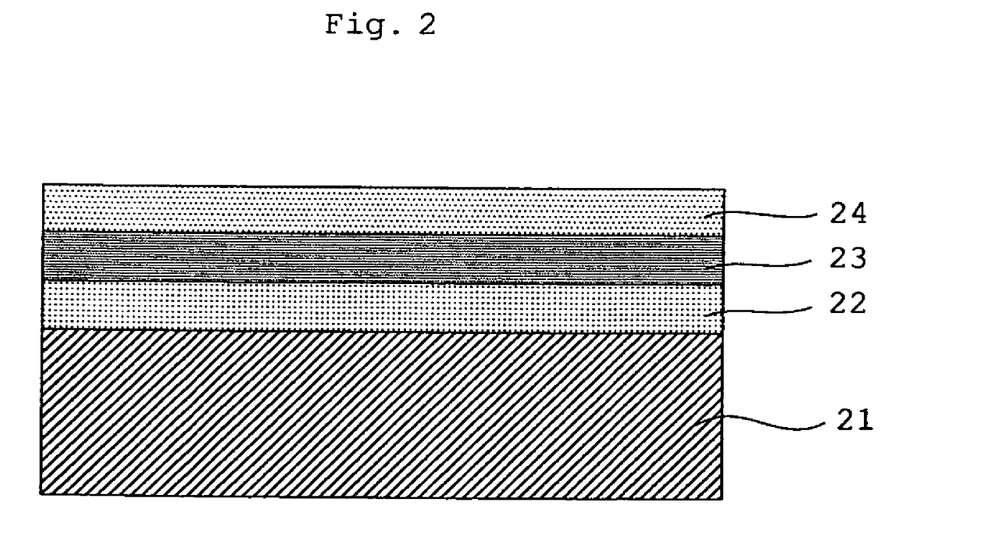
FIG. 2 is a cross-sectional view illustrating another exemplary layer structure of a multi-layer film.

This multi-layer film has a layer structure composed of Base 21/Polyvalent metal compound-containing layer 22/Carboxyl group-containing polymer layer 23/Polyvalent metal compound-containing layer 24 as illustrated in FIG. 2.

With respect to the multi-layer film obtained in such a manner, its peak ratio $A_{1560}/A_{1700}$, oxygen transmission rate and zinc concentration distribution in the thickness-wise direction of the PAA film were measured. The results are shown in Table 1.

The concentration distribution of zinc is illustrated in FIG. 4 by plotting a value of an element mole number ratio (Zn/C) against a distance in the thickness-wise direction from the metal compound-containing layer. As apparent from FIG. 4, the concentration of zinc in the PAA layer indicates a concentration gradient structure that the concentration is continuously reduced in the thickness-wise direction from a surface adjoining the ZnO-containing layer. Since both surfaces of the PAA layer adjoin the ZnO-containing layer, the measured result illustrated in FIG. 4 indicates that the PAA layer has a concentration gradient structure that the concentration of the polyvalent metal salt of the carboxyl group-containing polymer in the PAA layer is continuously reduced up to the central portion of the PAA layer in the thickness-wise direction from the surface adjoining the polyvalent metal compound-containing layer.

Comparative Example 1

A vapor deposition film of silicon oxide ($SiO_2$) was deposited on a PET film (product of Toray Industries, Inc., trade name "Lumirror™ S10") by means of a bell jar deposition machine. With respect to the multi-layer film obtained in such a manner and having a layer structure of "PET/$SiO_2$ deposit", its oxygen transmission rate was measured. The results are shown in Table 1

TABLE 1

| | Presence of concentration gradient structure of polyvalent metal salt by TEM-EDX | Peak ratio of IR spectrum, $A_{1560}/A_{1700}$ *1 | Chemical equivalent of polyvalent metal compound to carboxyl group *2 | Oxygen transmission rate *3 | | |
|---|---|---|---|---|---|---|
| | | | | — | After flex fatigue *4 | Humidity conditioning after flex fatigue *5 |
| Ex. 1 | Present | 0.5 | 2.0 | 68 | 170 | 67 |
| Ex. 2 | Present | 0.5 | 2.0 | 34 | 90 | 32 |
| Comp. Ex. 1 | Not present, SiO₂ deposit | — | — | 50 | 1000 | 1000 |

(Note)
*1 A peak height ratio $A_{1560}/A_{1700}$ in an infrared absorption spectrum of a film by the ATR method.
*2 A chemical equivalent of the polyvalent metal compound to the carboxyl group, which is calculated out on the basis of the total of the carboxyl group and the total of the polyvalent metal compound contained in all carboxyl group-containing polymers adjoining each other.
*3 The unit of the oxygen transmission rate is cm³ (STP)/m² · day · MPa (temperature: 30° C., relative humidity: 0%). The oxygen transmission rate of the PET film used as a base was 1,400 cm³ (STP)/m² · day · MPa (temperature: 30° C., relative humidity: 0%).
*4 An oxygen transmission rate after the flex fatigue test that 150 Gelvo flexings are carried out by means of the Gelvo tester.
*5 An oxygen transmission rate of a sample subjected to a humidity conditioning treatment for 20 hours under an environment of a temperature of 30° C. and a relative humidity of 80% after 150 Gelvo flexings are carried out by means of the Gelvo tester.

INDUSTRIAL APPLICABILITY

According to the present invention, there can be provided multi-layer films having excellent gas barrier property, moisture resistance, water resistance, hot water resistance and water vapor resistance and also having excellent gas barrier property under high-humidity conditions, to say nothing of low-humidity conditions. In the multi-layer films according to the present invention, their gas barrier properties can be recovered with time even when the gas barrier properties are deteriorated at the time they are subjected to folding processing upon forming, or formed products after the forming are flexed repeatedly. The multi-layer films according to the present invention can be suitably used in, for example, a field of packaging materials making good use of these various properties.

The invention claimed is:

1. A multi-layer film having a layer structure that a polyvalent metal compound-containing layer (B) adjoins one side or both sides of a polymer layer (A), the polymer layer (A) containing a carboxyl group-containing polymer as one and only one polymer element making up the polymer layer (A), and the carboxyl group-containing polymer containing a polyvalent metal salt, wherein (1) the multi-layer film has either a layer structure (i) of the polymer layer (A)/the polyvalent metal compound-containing layer (B), and the polymer layer (A) has a concentration gradient structure that the concentration of the polyvalent metal salt of the carboxyl group-containing polymer in the polymer layer (A) is continuously reduced up to a surface opposite to a surface adjoining the polyvalent metal compound-containing layer (B) of the polymer layer (A) in a thickness-wise direction from the adjoining surface, or a layer structure (ii) of the polyvalent metal compound-containing layer (B)/the polymer layer (A)/the polyvalent metal compound-containing layer (B), and the polymer layer (A) has a concentration gradient structure that the concentration of the polyvalent metal salt of the carboxyl group-containing polymer in the polymer layer (A) is continuously reduced up to a central portion of the polymer layer (A) in a thickness-wise direction from two surfaces each adjoining to one of the polyvalent metal compound-containing layers (B), and (2) a peak ratio $A_{1560}/A_{1700}$ of the height $A_{1560}$ of an absorption peak at a wave number of 1560 cm⁻¹ to the height $A_{1700}$ of an absorption peak at a wave number of 1700 cm−1 as determined on the basis of an infrared absorption spectrum of the polymer layer (A) is at least 0.25.

2. The multi-layer film according to claim 1, wherein the concentration gradient structure of the polymer layer (A) has a low concentration region of the polyvalent metal salt of the carboxyl group-containing polymer, whose element mole number ratio [metal element (n valence)/C element] calculated out on the basis of the result of elemental composition analysis in the thickness-wise direction by energy dispersive X-ray spectroscopy falls within a range of 0 to 0.06/n, in a proportion of 5 to 80% in terms of a thickness percentage of the polymer layer (A).

3. The multi-layer film according to claim 1, wherein the concentration gradient structure of the polymer layer (A) has a high concentration region of the polyvalent metal salt of the carboxyl group-containing polymer, whose element mole number ratio [metal element (n valence)/C element] calculated out on the basis of the result of elemental composition analysis in the thickness-wise direction by energy dispersive X-ray spectroscopy falls within a range of from higher than 0.06/n to not higher than 0.33/n, in a proportion of 20 to 95% in terms of a thickness percentage of the polymer layer (A) adjoining the polyvalent metal compound-containing layer (B).

4. The multi-layer film according to claim 1, wherein the multi-layer film has the layer structure (i), and the polymer layer (A) has a high concentration region of the polyvalent metal salt of the carboxyl group-containing polymer, whose element mole number ratio [metal element (n valence)/C element] calculated out on the basis of the result of elemental composition analysis in the thickness-wise direction by energy dispersive X-ray spectroscopy falls within a range of from higher than 0.06/n to not higher than 0.33/n, in a proportion of 20 to 95% in terms of a thickness percentage of the polymer layer (A) adjoining the polyvalent metal compound-containing layer (B), and has, on the side opposite to the surface adjoining the polyvalent metal compound-containing layer (B), a low concentration region of the polyvalent metal salt of the carboxyl group-containing polymer, whose element mole number ratio [metal element (n valence)/C element] falls within a range of 0 to 0.06/n, in a proportion of 5 to 80% in terms of a thickness percentage of the polymer layer (A).

5. The multi-layer film according to claim 1, wherein the multi-layer film has the layer structure (ii), and
the polymer layer (A) has a high concentration region of the polyvalent metal salt of the carboxyl group-containing polymer, whose element mole number ratio [metal element (n valence)/C element] calculated out on the basis of the result of elemental composition analysis in the thickness-wise direction by energy dispersive X-ray spectroscopy falls within a range of from higher than 0.06/n to not higher than 0.33/n, in a proportion of 20 to 95% in terms of a thickness percentage of the polymer layer (A) adjoining each of the polyvalent metal compound-containing layers (B), and has, at a central portion thereof, a low concentration region of the polyvalent metal salt of the carboxyl group-containing polymer, whose element mole number ratio [metal element (n valence)/C element] falls within a range of 0 to 0.06/n, in a proportion of 5 to 80% in terms of a thickness percentage of the polymer layer (A).

6. The multi-layer film according to claim 1, wherein a chemical equivalent of the polyvalent metal compound to the carboxyl group, which is calculated out on the basis of the total (At) of the carboxyl group contained in the whole carboxyl group-containing polymer layer (A) and the total (Bt) of the polyvalent metal compound contained in the whole carboxyl group-containing polymer layer (A) and the whole polyvalent metal compound-containing layer (B), is at least 1.0.

7. The multi-layer film according to claim 1, wherein an oxygen transmission rate as determined by using the multi-layer film formed into a cylindrical form as a sample to conduct a flex test of 150 Gelvo flexings by means of a Gelvo tester under conditions of a temperature of 5° C. and a relative humidity of 10% in accordance with the provisions of ASTM F 392, aging the sample for 20 hours under an environment of a temperature of 30° C. and a relative humidity of 80%, and then measuring an oxygen transmission rate of the sample after the aging under conditions of a temperature of 30° C. and a relative humidity of 0% in accordance with ASTM D 3985-81 is retained within ±50% of the oxygen transmission rate of the sample before the flex test.

8. The multi-layer film according to claim 1, wherein the carboxyl group-containing polymer has an oxygen transmission coefficient of at most 1,000 cm$^3$ μm/ (m$^2$·day·MPa) as determined in the form of a film formed by itself under low-humidity conditions of a temperature of 30° C. and a relative humidity of 0%.

9. The multi-layer film according to claim 1, wherein the carboxyl group-containing polymer is a homopolymer of a carboxyl group-containing unsaturated monomer, a copolymer of carboxyl group-containing unsaturated monomers, a copolymer of a carboxyl group-containing unsaturated monomer and any other polymerizable monomer, a carboxyl group-containing polysaccharide or a mixture of at least two monomers thereof.

10. The multi-layer film according to claim 1, wherein the carboxyl group-containing unsaturated monomer is at least one α, β-monoethylenically unsaturated carboxylic acid selected from the group consisting of acrylic acid, methacrylic acid, crotonic acid, itaconic acid, maleic acid and fumaric acid.

11. The multi-layer film according to claim 1, wherein the polyvalent metal compound is an oxide, carbonate, organic acid salt or alkoxide of beryllium, magnesium, calcium, copper, cobalt, nickel, zinc, aluminum or zirconium.

12. The multi-layer film according to claim 1, wherein the polyvalent metal compound is a divalent metal compound.

13. The multi-layer film according to claim 1, wherein the thickness of the polymer layer (A) is 0.001 μm to 1 mm, and the thickness of the polyvalent metal compound-containing layer (B) is 0.001 μm to 1 mm.

14. The multi-layer film according to claim 1, which is obtained by a process comprising forming at least one carboxyl group-containing polymer layer and at least one polyvalent metal compound-containing layer adjacently to each other on the base by a coating method and then aging the polyvalent metal compound-containing layer under an atmosphere of a relative humidity of at least 20% and a temperature of 5° C. to 200° C. to cause the polyvalent metal compound to migrate from the polyvalent metal compound-containing layer into the carboxyl group-containing polymer layer, thereby forming a polyvalent metal salt with the carboxyl group in the carboxyl group-containing polymer layer.

15. The multi-layer film according to claim 1, which has an oxygen transmission rate of at most 1,000 cm$^3$(STP)/ (m$^2$·day·MPa) as determined under high-humidity conditions of a temperature of 30° C. and a relative humidity of 80%.

16. A multi-layer film obtained by additionally arranging at least one another resin layer on one side or both sides of the multi-layer film according to claim 1.

* * * * *